FIG. I

United States Patent Office 3,384,117
Patented May 21, 1968

3,384,117
FLUID TRANSFER IN WAVE REACTORS AND THE LIKE
William B. Hansel, Media, Pa., assignor to Sun Oil Company, Philadelphia, Pa., a corporation of New Jersey
Filed Feb. 1, 1966, Ser. No. 524,019
4 Claims. (Cl. 137—624.13)

ABSTRACT OF THE DISCLOSURE

For transferring a pressurized gas to a rotor, a ported essentially stationary shoe member overlies the rotor, with a small gap therebetween. When the device is in operation, the flow of pressurized gas through the port and gap sets up a gas film between the adjacent surfaces of the shoe member and rotor, this film providing a bearing. The shoe member is loosely mounted on a channeled body member through which the gas flows, and during operation of the device the pressurized gas establishes a gas film between the shoe and body members.

---

This invention relates to a fluid transferring arrangement, for transferring a pressurized gas between a stationary and a moving surface.

Previously, there have been developed devices known as wave reactors or wave engines. In such devices, certain endothermic chemical reactions may be carried out by subjecting a reactant material to one or more mechanical shock waves, thereby to produce a high temperature in such material for a very short period of time. Such a wave reactor comprises (for an essentially continuous process) one or more shock tubes (within which the chemical reactions take place) which are rotated continuously (and rapidly) with respect to stationary ports, through which latter pressurized gases (e.g., driver gas, for creating the shock waves) are transferred to the shock tube or tubes. The arrangement for transferring pressurized gases from a stationary member to a moving surface, and vice versa, is equivalent to an electrical brush, but it is transferring gas instead of electricity; it may therefore be termed a "gas brush."

The transferring of fluids (specifically, pressurized gases) in an apparatus such as that described in the preceding paragraph presents rather difficult problems. It is desirable to maintain some clearance between the relatively moving bodies (between which there is a high rate of relative rubbing speed), to eliminate any galling or wear; at the same time, the clearance must be held to a minimum so as to limit the amount of leakage gas (which gas escapes and is consequently wasted) to an acceptable value. The maintenance of a clearance of 0.001 inch or thereabouts between two relatively moving bodies traveling at a high relative rate of speed has heretofore been considered almost impossible, since the high speed prohibits the use of sliding seals. Efficient gas transfer requires that a gap of 0.001 inch or less be maintained regardless of speed, temperature, pressure, centrifugal or thermal growth.

For the sake of convenience, as well as for the purpose of providing a specific description by way of example, the fluid transferring arrangement of this invention will be described in connection with a wave reactor of the above-mentioned type. However, it is desired to be pointed out that it may have other uses.

An object of this invention is to provide a novel fluid transferring arrangement for wave reactors.

Another object is to provide a fluid transferring arrangement which solves the above-mentioned problems in a novel manner.

A further object is to provide an improved arrangement for the transfer of fluid between two relatively moving bodies.

Still another object is to provide a novel form of hydrostatic seal between two relatively moving members.

The objects of this invention are accomplished, briefly, in the following manner: A stationary shoe member having a port therein is positioned to overlie a rotor carrying a plurality of shock tubes, to which pressurized gas is desired to be transferred from the stationary member. The port in the shoe member is supplied with pressurized gas, and this port is arranged to come into successive communication with the individual shock tubes as the rotor rotates. The shoe member is loosely mounted on a spring-loaded body member, and is coupled thereto by means of a hydrostatically-produced gas film (using the pressurized gas) which acts as a gas spring. Pressurized gas flows from the shoe port out through a small clearance gap between the adjacent surfaces of the shoe and of the rotor to establish a hydrostatic gas film between these surfaces, and as the rotor rotates, a hydrodynamic film is also set up between these surfaces. Special orifices supplied with start-up gas by way of a separate chamber are used to lift the shoe away from the rotor, for initial start-up of the latter from a rest position and for creation of the clearance gap between the shoe and the rotor. Two assemblages of hydrodynamic-film-type bearings are used to support and journal the rotor for rotation.

A detailed description of the invention follows, taken in conjunction with the accompanying drawings, wherein.

Figure 1:
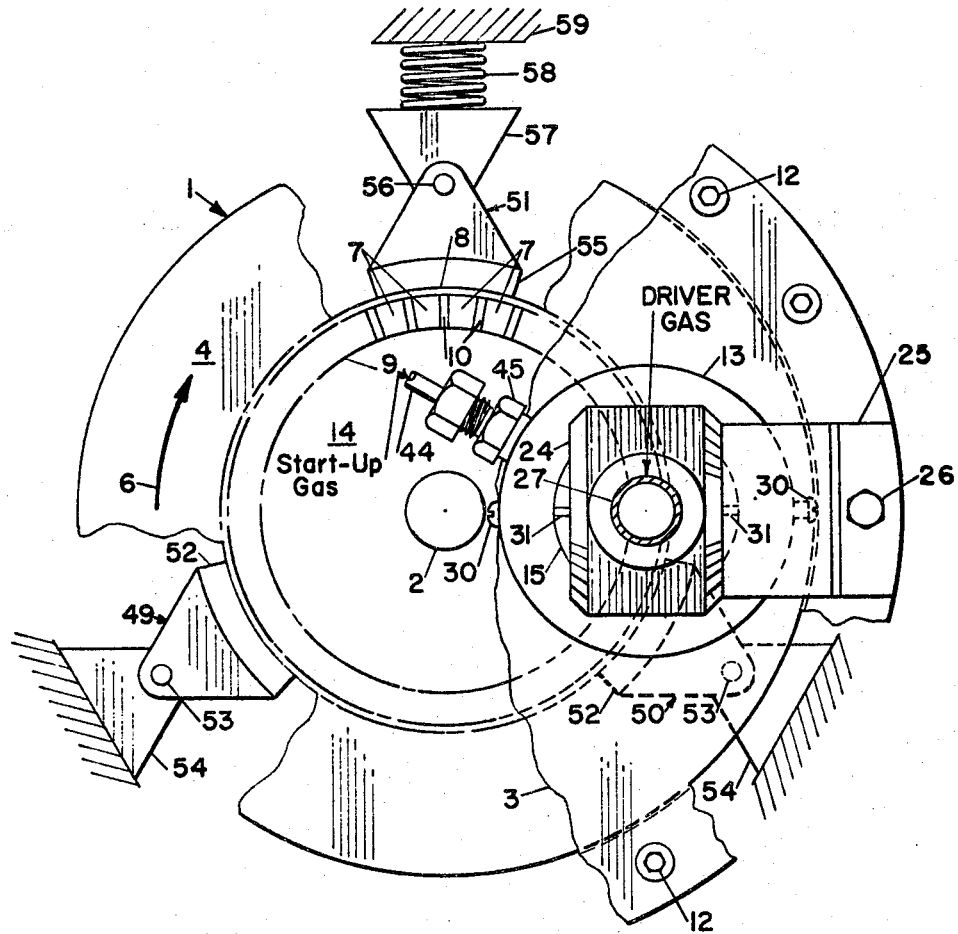
FIG. 1 is a front elevation of a typical wave reactor employing the fluid transferring arrangement of this invention.
Figure 2:
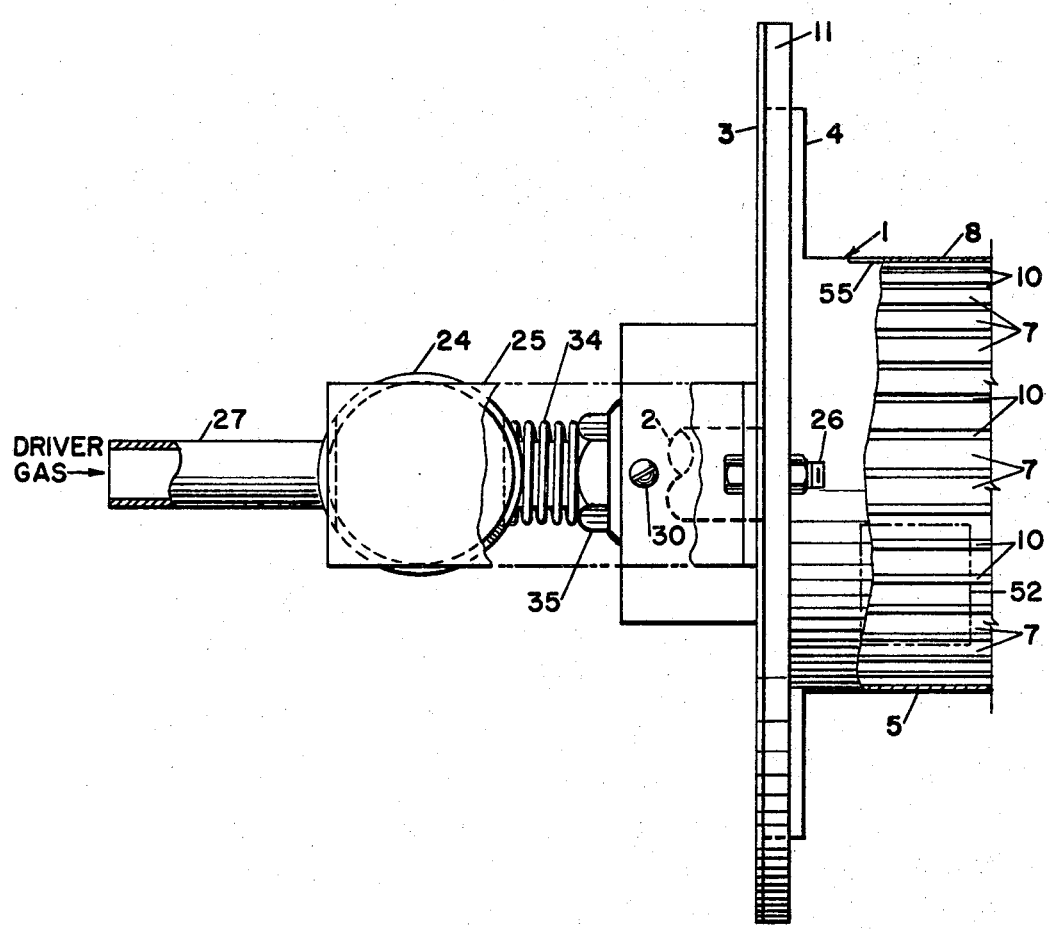
FIG. 2 is a side view of the apparatus of FIG. 1.

FIGS. 1 and 2 illustrate the fluid transferring arrangement of the invention utilized to supply driver gas to a rotary wave reactor of the type shown in Glick Patent No. 2,902,337, dated Sept. 1, 1959. In such a wave reactor, the impact of a high pressure driver gas upon a body of process gas in an elongated tube generates a shock wave which passes very rapidly through the gas and raises its pressure and temperature; the cutting off of the driver gas generates an expansion wave which passes rapidly through the gas and lowers both the pressure and temperature. A process of this sort is described in some detail in my copending application, Ser. No. 326,009, filed Nov. 26, 1963, now Patent No. 3,254,960, dated June 7, 1966.

FIGS. 1 and 2 are views illustrating a rotary reactor made up of a spool-shaped member 1, rotatable on shaft 2, and stationary members or cover plates (one of which is illustrated at 3) positioned adjacent the ends of the rotatable member. Although only one end of the rotary reactor is shown in FIGS. 1 and 2, it is desired to be pointed out that the other end of the reactor is exactly similar in construction to the end illustrated (at least to the extent of a duplication of the fluid transferring arrangement to be described); this is in accordance with FIG. 4 of the Glick patent, wherein duplicate arrangements for transferring driving gas are located at the two respective ends of the rotatable member.

The rotatable spool-shaped member 1 has a head portion 4 at each end of the cylindrical central portion 5 thereof. The rotatable member 1 is rotatable on shaft 2 (which is horizontally disposed in FIG. 2), in the direction indicated by arrow 6 in FIG. 1. The rotatable member 1 has a plurality of open-ended columns or tubes 7 positioned in a longitudinal (i.e., axial) direction around the periphery thereof. These columns or tubes (which may be thought of as shock tubes) are defined in the radial direction by an outer cover 8 which is sealed within a central opening provided in head portion 4 and by the outer surface 9 of a concentric inner cylinder 14, which latter may be solid. Tubes 7 are also defined by a plurality of partitions 10 which are circumferentially spaced and which extend between surface 9 and cover 8. It will be realized that the outer cover 8 forms the outer boundary of the cylindrical central portion 5 of member 1. When the apparatus is in operation, member 1 is rotated at a relatively high rate of speed, in the direction of arrow 6.

A stationary annular flange such as 11 is suitably supported at each end of the member 1, each flange surrounding closely a respective one of the head portions 4 of said member. The cover plates 3 are bolted as at 12 to the faces of the respective flanges 11.

A stationary cylindrical head member 13 is located within a suitable opening provided in cover plate 3, such that its lower circular end face overlies the end surface of the rotor or rotatable member 1 (see FIG. 3) and is centered over the ends of the tubes 7. Since the tubes 7, as previously stated, are open-ended, the ends of these tubes may be considered to be ports in the rotor 1.

The stationary member or head 13 has an enlarged opening drilled thereinto from its upper surface to provide a cylindrical recess 15 which opens upwardly. In this connection, it is noted that "upwardly" denotes outwardly or toward the observer in FIG. 1. The end wall 21 at the bottom of recess 15 has cut therethrough a passage forming a port 16 which opens to the exterior of member 13 and which has a cross-section equal to that of each of the tubes (ports) 7. It may be seen that as rotor 1 rotates in the direction of arrow 6, each of the rotor ports 7 will come successively into communication with the relatively stationary port 16.

A hemispherical socket member 17 is rigidly mounted within recess 15, member 17 having a depending cylindrical skirt at its bottom which is fastened in a cylindrical recess 18 (whose center line coincides with that of port 16) cut into the upper surface of the end wall 21. Member 17 has a central circular bore 19 at its bottom centered on the center line of port 16. At its upper end, socket 17 is sealed around its periphery to the wall of recess 15, thereby to provide an annular chamber 20 which is approximately triangular in cross-section; it may be seen that this chamber is bounded by the outer (lower, or maximum-diameter) surface of member 17, the cylindrical wall of recess 15, and the planar upper surface of the end wall 21. From the bottom wall of chamber 20, four equiangularly-spaced holes 22 are drilled downwardly into but not through the end wall 21, and from the bottom center of each respective hole 22 a small orifice 23 which is designed for critical flow (as will be explained hereinafter) is drilled through into the plane of the lower surface of end wall 21, which surface is of course a portion of the lower circular end face of head member 13.

An apertured abutment member 24 is rigidly secured to flange 11 by means of a Z-bracket 25 (formed, for example from two L-brackets secured together) one end of which is fastened to member 24 and the other end of which overlies cover plate 3 and flange 11 and is secured to the flange by means of a bolt 26 which passes through bracket 25, cover plate 3, and flange 11.

A tube 27 is mounted for sliding movement (by means of a suitable linear or sliding bearing, which permits sliding movement thereof, but not rotation thereof) within the aperture in member 24, but the outer end of this tube being coupled, through a flexible connection, to a suitable source of pressurized gas (for example, a driver gas). The lower or inner end of tube 27 is threaded into a tapped axial aperture 28 provided in a body member 29 having a spherical outer surface which matches the curvature of the outer (upper) surface of socket 17. Thus, body member 29 is constructed and arranged to function as the ball for socket 17.

The ball-and-socket construction described, together with the characteristic action of a film between the ball and the socket (which film is established in a manner to be later described), enables the socket-and-shoe assembly 17, 13 to "float" or pivot in any and all directions with respect to the (relatively stationary) ball 29. In the position illustrated in FIG. 3, the ball 29 is actually resting in the socket 17, in direct contact therewith; however, under other conditions (as will be hereinafter described), there is a small clearance (provided by a gas film) between the outer surface of ball 29 and the upper surface of socket 17. In order to allow for the above-described "floating" action, a "loose" coupling (that is, one entailing only a limited amount of restraint) is utilized between the head 13 (meaning, of course, the head 13 plus the socket 17, since the latter is firmly secured to the head) and the ball or body member 13. The aforementioned coupling comprises a pair of diametrically-opposite bolts 30 which extend through respective tapped apertures provided in the side wall of head 13, into the recess 15, these apertures being located above the upper face of socket 17. The bolts 30 carry, at their inner ends, respectively coaxial pins 31 of small diameter whose inner ends extend into respective sockets or holes 32 of enlarged diameter (as compared to the diameter of the pins) provided in the outer surface of ball member 29. Thus, the head 13 "floats" with respect to body member 29 and is free to move with respect thereto a considerable extent, but is eventually restrained by the walls of holes 32 coming into contact with the respective pins 31.

Ball member 29 has an enlarged axial bore 33 therein whose upper end communicates with the lower (inner) end of aperture 28, and whose lower end communicates with the bore 19 in socket 17. Thus, a passage for gas is provided from tube 27 to and through port 16, via aperture 28, bore 33, and bore 19.

Body member 29 is resiliently urged toward shoe member 13 (socket 17) by means of a rather strong compression spring 34 which serves as a loading spring and which surrounds but is spaced from tube 27. One end of spring 34 engages an abutment or stop (not shown) provided in fixed member 24, and the other end of this spring bears against the upper end of body member 29. At its upper end, member 29 has a set of "hex flats," as indicated at 35 (see FIG. 2) to enable manipulation of this member with a wrench during assembly.

Figure 3:
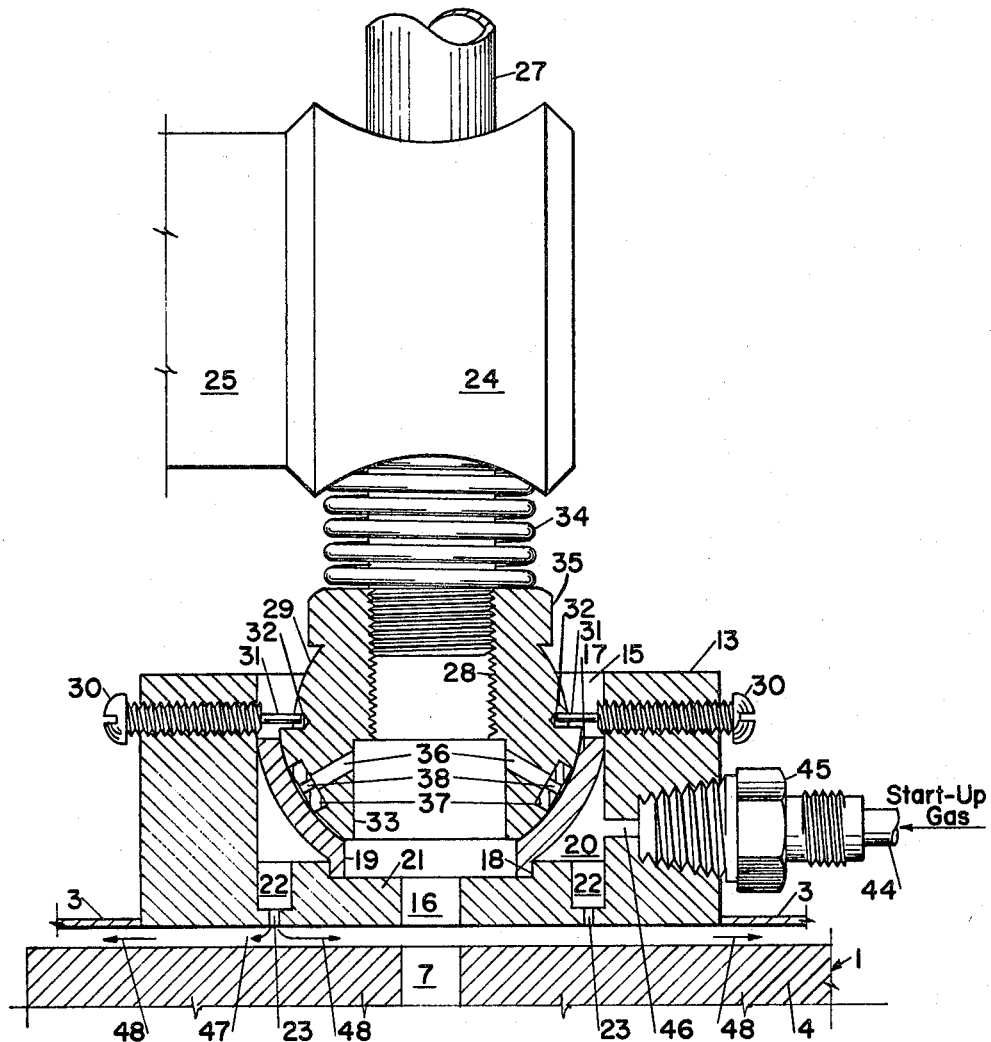
FIG. 3 is a sectional view, on an enlarged scale, of the fluid transferring portion of the FIG. 1 apparatus, illustrating the "start-up" condition of the apparatus.
Figure 4:
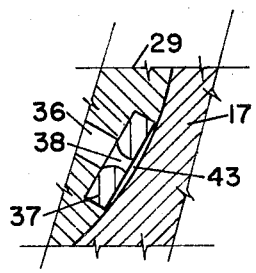
FIG. 4 is a view of a detail of FIG. 3, drawn on an enlarged scale.

From the upper region of bore 33, three equiangularly-spaced passages 36 extend downwardly and outwardly, toward and to the socket 17. For convenience of illustration, two of these passages are shown in FIGS. 3 and 4, although it should be remembered that these passages are actually 120° apart around the spherical surface of ball 29, rather than 180 apart, as might be inferred from the drawings. The outer end of each of these passages is counterbored to provide a larger diameter seat, and in each of these seats there is secured a cylindrical insert 37 in which there is a small orifice 38 (coaxial with its respective cylindrical passage 36) designed for critical flow. The outer face of each of the inserts 37 is planar and at 90° to the axis of the cylinder (see FIG. 4), so that a recess 43 is provided between this outer face and the adjacent spherical socket 17. The recesses 43 are immediately adjacent socket 17, in the assembled device. The orifices 38 are arranged to direct the flow of gas (which reaches them from tube 27 via aperture 28, bore 33, and the respective passage 36) toward the upper surface of socket 17.

Figure 5:
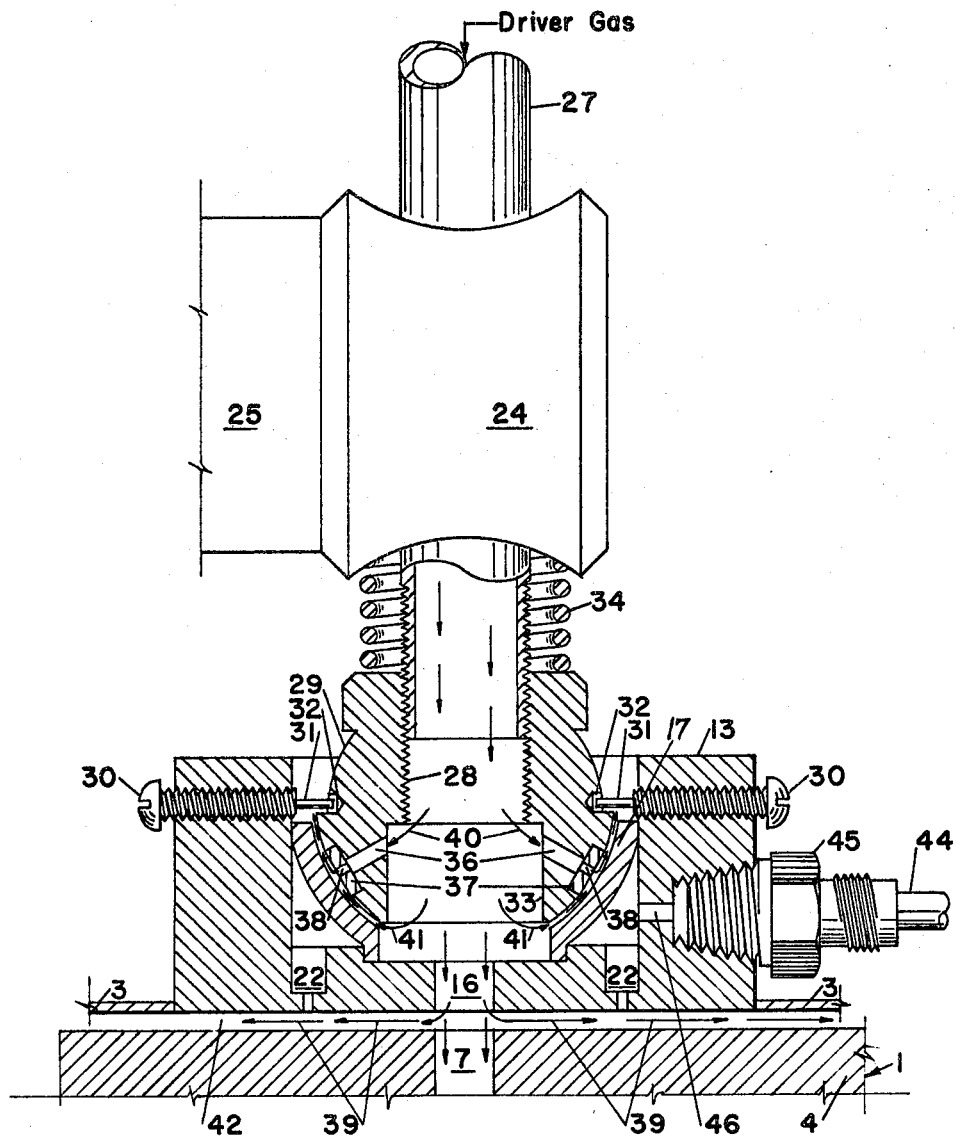
FIG. 5 is a view similar to FIG. 3 but illustrating the "run" condition of the apparatus.

Let us assume for the moment that the rotor 1 has been set into motion (the start-up procedure being described hereinafter), and is rotating at a high rate of speed about a spin axis which would extend vertically in FIG. 5, and would lie off the sheet, to the right of the figure (the rotor being rotated through shaft 2 by a motor, for example). Also assume that, at the time the pressurized gas is valved into the outer end of tube 27, the lower (inner) face of head 13, which overlies the rotor 1, is separated some small distance from the adjacent surface of the rotor, to provide a small gap 42 therebetween. FIG. 5 depicts the fluid transferring arrangement of the invention under these conditions. A portion of the pressurized gas issuing from the lower (inner) end of port 16 flows in all directions in the small gap 42, as indicated by the arrows 39, to hydrostatically provide a gas film which is very thin, say less than 0.001″ thick. As described up to this point, the production of this film utilizes hydrostatic lubrication principles. However, by employing a "floating" type of mounting (as previously described) for head 13, this head is permitted to so align itself (with respect to the hydrodynamic flow pattern of the process gas in the narrow clearance space, produced as a result of the movement of the rotor surface past this narrow space) as to allow some degree of hydrodynamic lubrication action to occur, thus contributing to the separating force between the shoe member or head 13 and the rotor 1. That is to say, the composite film-forming action which takes place between the surfaces of the head and of the rotor utilizes both hydrostatic and hydrodynamic principles.

To state the above in another way, the self-acting film (this term will be explained hereinafter) between head and rotor is formed by high pressure leakage (out of port 16) and by gas being drawn in between the surfaces by the high velocity rotor. This film thickness should remain constant if the running variables such as speed, temperature, pressure, and flatness do not change.

If a thin gap 42 is maintained between the relatively moving surfaces (the rotor and the shoe or head), wear is eliminated, and also, the amount of leakage gas (to wit, the gas that leaks out through the gap, and hence does not reach the shock tube 7) that can escape is controlled. In this connection, it will be understood that the purpose of the fluid transferring arrangement of this invention is to transfer fluid (e.g., pressurized driver gas) from the stationary port 16 to the shock tubes 7 in the rotor 1. The gas that leaks out through the gap between the relatively moving surfaces is of course lost and represents a waste, insofar as the chemical reactions in the shock tubes 7 are concerned. The means by which the gap between the relatively moving surfaces is automatically maintained, such that the gas film between these surfaces becomes self-acting, will now be described.

Pressurized gas supplied by way of tube 27 can flow from bore 33 through passages 36 and thence through the small orifices 38 and recesses 43, as indicated by arrows 40. As previously stated, these orifices 38 are sized to act as critical-flow orifices. Critical flow takes place through an orifice when the ratio of the pressure downstream of the orifice to the pressure upstream thereof is equal to or less than a "critical ratio," which has a value of approximately 0.53 (53%) for gas. The aforementioned "critical ratio" is that at which acoustic velocity of the gas flow is attained in the throat of the orifice.

The flow of gas out through the three orifices 38, against the upper surface of socket 17, causes a very small separation or gap between ball 29 and socket 17 (as illustrated in FIG. 5), by setting up, hydrostatically, a very thin gas film between the ball and the socket. Once this gap has been established, there may be, in addition, a small flow of gas from the lower (inner) end of bore 33 into and along the gap, as indicated by arrows 41; this last-mentioned gas flow may assist in maintaining the gas film between ball 29 and socket 17.

The static film (see FIG. 5) between ball 29 (the male portion of the ball-and-socket arrangement) and socket 17 (the female portion of the ball-and-socket arrangement) serves as a gas spring. The static film of this gas spring is formed by leakage between male and female parts 29 and 17 of the spherical assembly (as at 41), and by flow through the three critical-flow orifices 38 in the male portion 29 (as at 40).

The spherical bearing provided by the gas film between ball 29 and socket 17, as well as by the ball and socket themselves, has two functions. In the first place, it serves to physically separate and socket-and-shoe assembly 17, 13 from the ball 29, and thus to provide a frictionless coupling, allowing the head or shoe 13 to align itself with the rotor 1 and to adopt a tilting attitude with respect to the rotor. This tilt allows the moving rotor to drag in a wedge of gas, thus forming the hydrodynamic component of lift between the head 13 and rotor 1.

The second function of the spherical bearing is to control and keep constant the main leakage gap 42, which is the gap between rotor 1 and head 13. This function can perhaps best be explained by considering the head 13 as floating (which in reality it does) between the flat surface of rotor 1 and the spherical ball 29. If the head 13 attempted to move away from the rotor 1 (gap 42 becoming larger), the pressure within the spherical socket 17 (that is, the pressure in the gap between ball 29 and socket 17) would increase, thus repelling the motion of the head. If the head 13 tended to move toward the rotor 1 (gap 42 becoming smaller), the pressure within the spherical socket 17 would fall, thus retarding the motion of the head. Considering the head 13 to be floating, as just described, the action of the spherical bearing to keep constant the gap 42 may be also thought of as action to keep the head 13 in an equilibrium position.

The low inertia and rapid response of the system described in the preceding paragraph, as compared to those of the coil spring assembly 34, 29, 27, make the ball section 29 of the spherical bearing appear stationary. The coil spring assembly will, however, follow slow changes like those that could result from thermal expansion. By way of example, if a slow (thermally-induced) change decreases gap 42, ball 29 is caused to move upwardly against the bias of spring 34, permitting head 13 to move upwardly to re-establish gap 42 at its fixed, predetermined value. Again, the action is such as to maintain head 13 is an equilibrium position.

The hydrostatic seal provided at the gap 42 has reserve hydrodynamic component action. That is to say, the hydrodynamic component of the gas film at 42 (resulting from the dynamic action previously described) provides a safety factor. The hydrodynamic action is very non-linear, so that if for some reason (say, for example, overload or reduction of hydrostatic load-carrying pressure) the clearance at 42 should become markedly reduced, the hydrodynamic action as a result would become much stronger and act as a safety feature to maintain the clearance, although thin.

Summarizing what has gone before, the shoe 13 rides at a fixed and predetermined clearance above (in front of) the moving member 1, and as a result pressurized gas is passed from port 16 (in the stationary member) to port 7 (in the moving member), with a small and acceptable loss of flow (the flow out through the gap 42 being lost, as is also the flow out between the ball 29 and the socket 17).

The thickness of the gap 42, and consequently the amount of leakage, can be adjusted by adjusting the variables of the design, which comprise: the load applied to the shoe 13 (through spring loading at 34, etc.), the size of the shoe, the size (specifically, depth) of the recesses 43, the pressure of the gas supply, the velocity at which rotor 1 passes by the shoe, and the viscosity of the pressurized gas.

When the rotor 1 is to be started up from a standstill, a special start-up means and procedure must be used. Before startup, the shoe 13 will be in firm contact with the rotor, being urged into this position by the strong spring 34; the member 13 will then act as an effective brake on the rotor. Under these conditions, the application of pressurized gas at 27 will not lift the shoe from the rotor, since this gas will flow from port 16 directly into and through one or more of the tubes 7 in the rotor, and will not lift the shoe from the surface of the rotor. According to this invention, separate start-up means is provided for the fluid transferring arrangement, comprising special orifices and a separate chamber. This means will now be described. See FIG. 3.

For startup, a suitable start-up gas (a pressurized gas) is supplied by means of a pipe or hose 44 to a radially-extending hose coupling 45 which is threaded into a side wall of head 13 and whose inner end communicates by means of a short radial passage 46 with the start-up gas chamber 20. The start-up gas supplied at 44 flows into chamber 20, and from thence flows through holes 22 into and through the small-diameter critical-flow orifices 23, which latter are spaced radially from the main head port 16, and also from the tube 7 in the rotor (it will be remembered that the center of port 16 is on the same base circle as that on which lie the centers of the rotor tubes 7). As previously stated, the orifices 23 open into the lower circular end face of head or shoe member 13.

Now refer to FIG. 3, which illustrates the device under start-up conditions. For startup, the driver gas is cut off from tube 27, and start-up gas is supplied by pipe 44 to the device. The start-up gas, flowing from chamber 20 through orifices 23, impinges on the surface of the rotor 1 (which is relatively massive) and causes the head 13 to lift away therefrom, against the bias of spring 34, to create a gap 47. The start-up gas, issuing from the orifices 23, flows in the radial direction between the adjacent surfaces of the head and rotor, as indicated by the arrows 48, to hydrostatically provide a gas film which maintains the gap 47. When this gap 47 has been established as described, the rotor is started up and, as it reaches operating speed, the pressurized driver gas is valved into tube 27, and the start-up gas is cut off from pipe 44. The gap having been already established when the pressurized driving gas is turned on, the conditions illustrated in FIG. 5 (and previously explained) take over, and the operation is then according to FIG. 5.

If desired or found necessary, recesses of the same character as those illustrated at 43 may be provided at the downstream ends of the orifices 23.

Referring again to FIGS. 1 and 2, it should be pointed out that, for a complete wave reactor, the fluid transferring arrangement shown in detail in FIGS. 3-5 would ordinarily be duplicated at the far end (not shown) of the rotor 1.

Further, to make a complete reactor, a driver gas outlet and a product gas oulet would be provided at one end of the rotor (for example, at the end illustrated in FIGS. 1 and 2); also, a driver gas outlet, a product gas outlet, and a process gas inlet would be provided at the far end (not shown) of the rotor 1. These various other inlets and outlets could be arranged geometrically as shown for example in FIGS. 4-6 of the aforementioned Glick patent. Since all of these various other inlets and outlets involve a pressure differential, of one sort or another, between the moving surface of rotor and the stationary member or port, arrangements similar to that described hereinabove could be used for such other inlets and outlets.

According to this invention, hydrodynamic bearings may be used to help support the weight of the rotor 1, and to journal the same for rotation about its horizontal axis; these hydrodynamic bearings may be in addition to other bearings used with shaft 2. Refer again to FIGS. 1 and 2. By way of example, a set of three equiangularly-spaced bearings 49, 50, and 51 may be used near one end of the cylindrical central portion 5 of the rotor, and a duplicate set of three equiangularly-spaced bearings (not shown) may be used near the other end of the central portion of the rotor. Since the two sets of bearings are exact duplicates of each other, only one set will be described in detail.

Bearing 49 comprises a shoe 52 pivotally secured as at 53 to a rigid support 54, the shoe 52 overlying a portion of the central cylindrical portion 5 of rotor 1 and serving as a pad (see FIG. 2, wherein the pad 52 is represented in phantom). The construction of bearing 50 is exactly similar to that of bearing 49 just described. Bearing 51, which is located in the twelve o'clock or vertical position with respect to rotor 1, comprises a shoe 55 (which serves as a pad) pivotally connected as at 56 to a mounting member 57 which is resiliently coupled by means of a spring 58 to a fixed support indicated at 59. By means of this construction, the shoe 55 is spring-loaded, as well as pivoted.

The shoes 52 and 55 closely overlie the outer surface of the cylindrical central portion 5 of rotor 1, and as this rotor rotates at a high rate of speed, a gas film is set up (by hydrodynamic action) between the surface of each of the shoes 52 and 55 and the subjacent surface of the rotor. These gas films serve as hydrodynamic-film-type bearings which support the rotor, and journal the same for rotation. The theory underlying such bearings is known to those skilled in the art to which this invention relates, so will not be repeated here.

If desired, process gas could be used for the hydrodynamic pads 52 and 55. For this, a process-gas-filled enclosure would be used, this enclosure surrounding all of the hydrodynamic bearing structure including the fixed supports 54 and 59.

Although the fluid transferring arrangement of the invention has been described hereinabove in connection with a wave reactor comprising a plurality of shock tubes extending parallel to the spin axis of the rotor, it is equally applicable to other types of wave reactors (e.g., that disclosed in my copending application above mentioned, wherein a shock tube extends perpendicularly to the spin axis of a rotating disc). In this case, since the ends of the shock tube open into the cylindrical outer surface of a disc which is rotated about an axis perpendicular to the circular end faces of the disc, fluid must be transferred to and from a ring which surrounds the disc; therefore, for this application of the fluid transferring arrangement the working face of the head member 13 (i.e., the face of this member closest to the shock tube or tubes) would necessarily have to be arcuate, rather than flat as in FIGS. 3-5. Then, two driver gas nozzles would be utilized, using the design explained above in connection with FIGS. 3-5. Also, a series of inlet and outlet pads (for transferring reactant gas into the shock tube and for transferring a product sample and gaseous products out of the shock tube) would be utilized, using the same design principles. Also, pivoted and spring-loaded hydrodynamic bearing pads, similar to pads 49-51, would be employed.

The fluid transferring arrangement has been described hereinabove in connection with wave reactors. However, it is useful in various other environments. Actually, what has been provided is a rotating and/or reciprocating seal that has various applications, wherever gas must be transferred between moving and stationary surfaces. Thinking of the device as a seal, it is not limited to use with gas, but can also be employed in a number of geometrical forms with liquids, to perform the same type of transfer function.

The invention claimed is:

1. A fluid transferring arrangement comprising a moving surface having a first port therein; a stationary shoe member overlying said moving surface and having a second port in its overlying portion which comes into communication with said first port during the movement of said surface, the total overlying area of said shoe member being in excess of the cross-sectional area of each of said ports; a stationary body member overlying a portion of the surface of said shoe member on the side thereof opposite said moving surface, said body member having therein a fluid flow channel which communicates with said second port; means providing a loose mechanical coupling between said body member and said shoe member, means for supplying a pressured fluid to the channel in said body member for passage therethrough to said second port, the arrangement being such that a small portion of the fluid passing through said second port flows between the overlying portion of said shoe member and said moving surface to provide a fluid film therebetween; and means for forming a fluid film between the adjacent surfaces of said body member and of said shoe member.

2. Arrangement as defined in claim 1, including also means for resiliently urging said body member toward said shoe member.

3. Arrangement according to claim 1, wherein said pressured fluid provides the fluid for the last-mentioned film.

4. Arrangement according to claim 1, wherein said moving surface comprises one surface of a rotor which is rotated continuously with respect to said shoe member and said body member; said arrangement including in addition means providing a hydrodynamic film bearing serving to journal said rotor for continuous rotation.

References Cited
UNITED STATES PATENTS

| | | | |
|---|---|---|---|
| 2,752,197 | 6/1956 | Marco | 308—9 X |
| 3,152,845 | 10/1964 | Ertaud | 308—9 |
| 3,308,848 | 3/1967 | Johnson | 308—9 X |
| 3,325,229 | 6/1967 | Webb | 308—9 X |

ALAN COHAN, *Primary Examiner.*